(12) United States Patent
Choi et al.

(10) Patent No.: US 8,928,742 B2
(45) Date of Patent: Jan. 6, 2015

(54) APPARATUS AND METHOD FOR PROCESSING IMAGE AND APPARATUS AND METHOD FOR DISPLAYING USING THE SAME

(75) Inventors: Kyoung-oh Choi, Seoul (KR); Chang-won Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 557 days.

(21) Appl. No.: 13/185,725

(22) Filed: Jul. 19, 2011

(65) Prior Publication Data

US 2012/0013719 A1 Jan. 19, 2012

(30) Foreign Application Priority Data

Jul. 19, 2010 (KR) .................. 10-2010-0069565

(51) Int. Cl.
*H04N 13/04* (2006.01)
*G09G 5/00* (2006.01)
*H04N 13/00* (2006.01)

(52) U.S. Cl.
CPC ....... *H04N 13/0438* (2013.01); *H04N 13/0029* (2013.01); *H04N 13/0497* (2013.01)
USPC ................................ 348/56; 345/8

(58) Field of Classification Search
CPC .......... H04N 13/0438; H04N 13/0003; H04N 13/0422; H04N 13/0055; H04N 13/0425; G02B 27/017; G02B 2027/0132; G02B 2027/0187; G02B 27/0176
USPC ........................................ 348/26, 53; 345/8
See application file for complete search history.

(56) References Cited

U.S. PATENT DOCUMENTS

| 2006/0044388 A1* | 3/2006 | Kim et al. ........................ 348/42 |
| 2008/0303963 A1* | 12/2008 | Jung et al. ........................ 349/13 |
| 2011/0216172 A1* | 9/2011 | Kerofsky ........................ 348/53 |
| 2013/0278652 A1* | 10/2013 | Nakahata ........................ 345/694 |

* cited by examiner

*Primary Examiner* — Dave Czekaj
*Assistant Examiner* — Tsion B Owens
(74) *Attorney, Agent, or Firm* — Sughrue Mion, PLLC

(57) ABSTRACT

A display apparatus, display method, image processing apparatus, and image processing method which are capable of allowing a stereoscopic image to be recognized exactly by a left eye and a right eye. The display apparatus includes: an image signal receiving unit which receives an image signal; an image signal processing unit which generates a scanning signal for scanning a left eye image signal and a right eye image signal of the image signal alternately and for scanning a part of the left eye image signal or a part of the right eye image signal between a section for scanning the left eye image signal and a section for scanning the right eye image signal; and an image output unit which displays the image signal according to the scanning signal.

21 Claims, 11 Drawing Sheets

APPARATUS AND METHOD FOR PROCESSING IMAGE AND APPARATUS AND METHOD FOR DISPLAYING USING THE SAME

CROSS-REFERENCE TO RELATED APPLICATIONS

This application claims priority from Korean Patent Application No. 10-2010-0069565, filed on Jul. 19, 2010 in the Korean Intellectual Property Office, the disclosure of which is incorporated herein in its entirety by reference.

BACKGROUND

1. Field

Apparatuses and methods consistent with exemplary embodiments relate to an apparatus and a method for processing an image and an apparatus and a method for displaying using the same, and more particularly, to an apparatus and a method for processing a stereoscopic image and an apparatus and a method for displaying using the same.

2. Description of the Related Art

Generally, a left eye image and a right eye image are displayed alternately to realize a three-dimensional (3D) display such as a stereoscopic 3D projector or a 3D flat panel display. In order to display a left eye image and a right eye image exactly in a left eye and a right eye respectively, thereby realizing the 3D display, a specially-designed display system is used.

Usually, a liquid crystal display (LCD) apparatus, from among various display apparatuses, scans a light sequentially in a vertical direction, and a left eye image and a right eye image are displayed together in scanning areas other than a vertical blanking interval (VBI) where only one of a left eye image and a right eye image is displayed. Accordingly, in order to display a left eye image in a left eye portion of shutter glasses and a right eye image in a right eye portion of shutter glasses, various specially-designed apparatuses are used. In particular, when a shutter glasses method is used, a left eye image or a right eye image should be transmitted only in a VBI section. Therefore, a general LCD apparatus is not appropriate for realizing 3D display.

In addition, while realizing a 3D image, crosstalk, i.e., interference between a left eye image and a right eye image, may occur since a left eye image and a right eye image are displayed independently only in a VBI section.

SUMMARY

Aspects of one or more exemplary embodiments relate to an apparatus and a method for processing an image which allow a stereoscopic image to be recognized by a left eye and a right eye accurately and an apparatus and a method for displaying using the same.

According to an aspect of an exemplary embodiment, there is provided a display apparatus including: an image signal receiving unit which receives an image signal; an image signal processing unit which generates a scanning signal for scanning a left eye image signal and a right eye image signal corresponding to the image signal alternately and for scanning a part of the left eye image signal or a part of the right eye image signal between a section for scanning the left eye image signal and a section for scanning the right eye image signal; and an image output unit which displays the image signal according to the scanning signal.

The display apparatus may further include a shutter glasses sync signal generating unit which generates a shutter glasses sync signal for turning on a left shutter of shutter glasses for viewing the image signal when a section for scanning part of the left eye image signal starts, turning off the left shutter when the section for scanning part of the left eye image signal ends, turning on a right shutter of the shutter glasses when a section for scanning part of the right eye image signal starts, and turning off the right shutter when the section for scanning part of the right eye image signal ends.

The display apparatus may further include a shutter glasses sync signal output unit which modulates the generated shutter glasses sync signal to an infrared (IR) signal or a radio frequency (RF) signal and outputs the IR signal or the RF signal.

The image signal processing unit may include: a three-dimensional (3D) image signal determining unit which determines whether the received image signal is a two-dimensional (2D) image signal or a 3D image signal; a left eye/right eye image signal determining unit which, if the received image signal is the 3D image signal, determines whether the 3D image signal is the left eye image signal or the right eye image signal; and a scanning signal generating unit which generates the scanning signal for scanning part of horizontal lines of the left eye image signal or part of horizontal lines of the right eye image signal between the section for scanning the left eye image signal and the section for scanning the right eye image signal.

The scanning signal may be a scanning signal for scanning part of the left eye image signal or part of the right eye image signal between a pair of vertical blanking sections.

In an exemplary embodiment, part of the left eye image signal and part of the right eye image signal may be image signals corresponding to a scope allowed by a bandwidth of the display apparatus.

In another exemplary embodiment, at least one of part of the left eye image signal and part of the right eye image signal may be an even number line signal or an odd number line signal of the corresponding eye image signal.

In another exemplary embodiment, part of the left eye image signal or the part of the right eye image signal may be a line signal which is selected randomly from among horizontal scanning lines of the corresponding eye image signal.

The part of the left eye image signal or the part of the right eye image signal may downscale the corresponding eye image signal to an even number line signal or an odd number line signal of the corresponding eye image signal, or include correction image information for correcting a charge rate of a liquid crystal by filtering the left eye image signal or the right eye image signal.

The image signal processing unit may generate an output Vsync signal corresponding to the image signal and the scanning signal which is divided into the section for scanning the left eye image signal, a section for scanning part of the left eye image signal, the section for scanning the right eye image signal, and a section for scanning part of the right eye image signal according to the generated output Vsync signal.

According to an aspect of another exemplary embodiment, there is provided a display method of a display apparatus, the method including: receiving an image signal, outputting a scanning signal for scanning a left eye image signal and a right eye image signal corresponding to the image signal alternately and for scanning part of the left eye image signal or part of the right eye image signal between a section for scanning the left eye image signal and a section for scanning the right eye image signal, and displaying the image signal according to the scanning signal.

The display method may further include outputting a shutter glasses sync signal for turning on a left shutter of shutter glasses for viewing the image signal when a section for scanning part of the left eye image signal starts, turning off the left shutter when the section for scanning part of the left eye image signal ends, turning on a right shutter of the shutter glasses when a section for scanning part of the right eye image signal starts, and turning off the right shutter when the section for scanning part of the right eye image signal ends.

The display method may further include modulating the generated shutter glasses sync signal to an infrared (IR) signal or a radio frequency (RF) signal and outputting the IR signal or the RF signal.

In an exemplary embodiment, the outputting the scanning signal may include: determining whether the received image signal is a 2D image signal or a 3D image signal; if the received image signal is the 3D image signal, determining whether the 3D image signal is the left eye image signal or the right eye image signal; and outputting the scanning signal for scanning a part of horizontal lines of the left eye image signal or a part of horizontal lines of the right eye image signal between the section for scanning the left eye image signal and the section for scanning the right eye image signal.

The scanning signal may be a scanning signal for scanning the part of the left eye image signal or the part of the right eye image signal between a pair of vertical blanking sections.

In an exemplary embodiment, part of the left eye image signal and the part of the right eye image signal may be image signals corresponding to a scope allowed by a bandwidth of the display apparatus.

In another exemplary embodiment, at least one of the part of the left eye image signal and the part of the right eye image signal may be an even number line signal or an odd number line signal of the corresponding eye image signal.

In another exemplary embodiment, at least one of the part of the left eye image signal and the part of the right eye image signal may be a line signal which is selected randomly from among horizontal scanning lines of the corresponding eye image signal.

At least one of the part of the left eye image signal and the part of the right eye image signal may downscale the corresponding eye image to an even number line signal or an odd number line signal of the corresponding eye image signal, or may include correction image information for correcting a charge rate of a liquid crystal by filtering the left eye image signal or the right eye image signal.

In an exemplary embodiment, the outputting the scanning signal may include: generating an output Vsync signal corresponding to the image signal; and outputting the scanning signal which is divided into the section for scanning the left eye image signal, a section for scanning part of the left eye image signal, the section for scanning the right eye image signal, and a section for scanning part of the right eye image signal according to the generated output Vsync signal.

According to an aspect of another exemplary embodiment, there is provided an image processing apparatus including: an input unit which receives an image signal and an input Vsync signal; a Vsync signal generating unit which generates an output Vsync signal based on the input Vsync signal; and a scanning signal generating unit which generates a scanning signal for according to the output Vsync signal.

The scanning signal generating unit may downscale a left eye image signal or a right eye image signal corresponding to the image signal to an even number line signal or an odd number line signal as the part of the image signal, or generate correction image information for correcting a charge rate of a liquid crystal by filtering the left eye image signal or the right eye image signal, and part of the image signal may include the generated correction image information.

The Vsync signal generating unit may generate a first output Vsync signal and a second Vsync signal based on the input Vsync signal, and the scanning signal generating unit may generate a first scanning signal for scanning a left eye image signal or a right eye image signal corresponding to the image signal according to the first output Vsync signal, and a second scanning signal for scanning part of the image signal according to the second output Vsync signal.

Frame rates of the first scanning signal and the second scanning signal may be greater than a frame rate of the image signal.

In an exemplary embodiment, the image processing apparatus may further include a shutter glasses sync signal generating unit which generates a shutter glasses sync signal for turning on a left shutter of shutter glasses for viewing the image signal when a section for scanning a part of a left eye image signal corresponding to the image signal starts, turning off the left shutter when the section for scanning the part of the left eye image signal ends, turning on a right shutter of the shutter glasses when a section for scanning a part of a right eye image signal corresponding to the image signal starts, and turning off the right shutter when the section for scanning the part of the right eye image signal ends.

The image processing apparatus may further include a shutter glasses sync signal transmitter which modulates the shutter glasses sync signal to an infrared (IR) signal or a radio frequency (RF) signal and transmits the modulated IR or RF signal to the shutter glasses.

In an exemplary embodiment, part of image signal may be an image signal corresponding to a scope allowed by a bandwidth of the image processing apparatus.

In another exemplary embodiment, part of the image signal may be an even number line signal or an odd number line signal of the image signal.

In another exemplary embodiment, part of the image signal may be a line signal which is selected randomly from among horizontal scanning lines of the image signal.

According to an aspect of another exemplary embodiment, there is provided an image processing method including: receiving an image signal and an input Vsync signal; outputting an output Vsync signal based on the input Vsync signal; and outputting a scanning signal for scanning part of the image signal in one of sections which is divided according to the output Vsync signal.

In an exemplary embodiment, the outputting the scanning signal may include downscaling a left eye image signal a eye image signal corresponding to the image signal to an even number line signal or an odd number line signal as the part of the image signal, or generating correction image information for correcting a charge rate of a liquid crystal by filtering the left eye image signal or the right eye image signal, and the part of the image signal may include the generated correction image information.

In an exemplary embodiment, the outputting the Vsync signal may include generating a first output Vsync signal and a second Vsync signal based on the input Vsync signal, and the outputting the scanning signal may include outputting a first scanning signal for scanning a left eye image signal or a right eye image signal corresponding to the image signal according to the first output Vsync signal and outputting a second scanning signal for scanning the part of the image signal according to the second output Vsync signal.

Frame rates of the first scanning signal and the second scanning signal may be greater than a frame rate of the image signal.

In an exemplary embodiment, the image processing method may further include outputting a shutter glasses sync signal for turning on a left shutter of shutter glasses for viewing the image signal when a section for scanning a part of a left eye image signal corresponding to the image signal starts, turning off the left shutter when the section for scanning the part of the left eye image signal ends, turning on a right shutter of the shutter glasses when a section for scanning a part of a right eye image signal corresponding to the image signal starts, and turning off the right shutter when the section for scanning the part of the right eye image signal ends.

The image processing method may further include modulating the shutter glasses sync signal to an infrared (IR) signal or a radio frequency (RF) signal and transmitting the modulated IR or RF signal to the shutter glasses.

In an exemplary embodiment, part of the image signal may be an image signal corresponding to a scope allowed by a bandwidth of the image processing apparatus.

In another exemplary embodiment, part of the image signal may be an image signal corresponding to a scope allowed by a bandwidth of the image processing apparatus.

In another exemplary embodiment, part of the image signal may be a line signal which is selected randomly from among horizontal scanning lines of the image signal.

According to an aspect of another exemplary embodiment, there is provided an image processing method including: generating a scanning signal for scanning a left eye image signal and a right eye image signal alternately and for scanning a part of the left eye image signal or a part of the right eye image signal between a section for scanning the left eye image signal and a section for scanning the right eye image signal.

According to one or more exemplary embodiments, a stereoscopic image may be recognized exactly by a left eye and a right eye as shutter glasses are controlled according to a scanning signal for scanning part of a left eye image signal or part of a right eye image signal.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
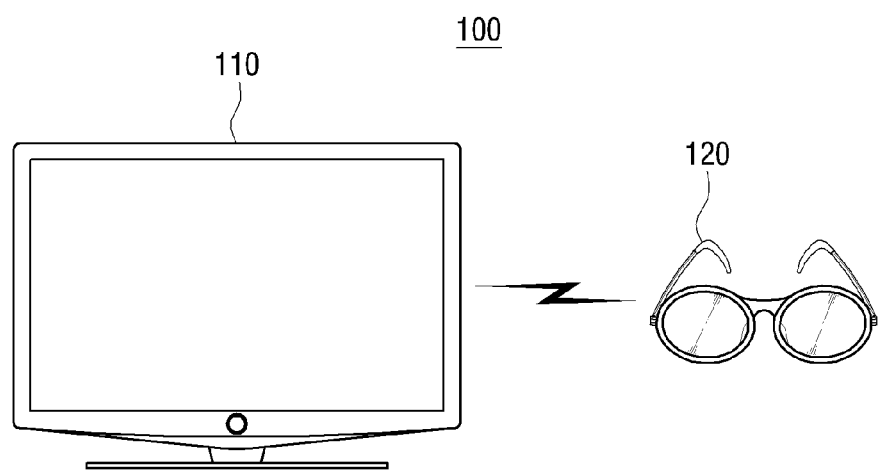
FIG. 1 is a view illustrating a three-dimensional (3D) image providing system according to an exemplary embodiment.

Certain exemplary embodiments will now be described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the exemplary embodiments with unnecessary detail. It is understood that expressions such as "at least one of," when preceding a list of elements, modify the entire list of elements and do not modify the individual elements of the list.

FIG. 1 is a view illustrating a three-dimensional (3D) image providing system according to an exemplary embodiment. As illustrated in FIG. 1, the 3D image providing system 100 includes a display apparatus 110 for displaying a 3D image on a screen and 3D glasses 120 for watching the 3D image.

The display apparatus 110 may be embodied to display a 3D image or both of a two-dimensional (2D) image and a 3D image.

When displaying the 2D image, the display apparatus 110 may use the same method as that of a related art 2D display apparatus. When displaying the 3D image, the display apparatus 110 may receive a 3D image from a photographing device (such as a camera or the like), a reproducing apparatus, a broadcasting station, etc., process the received image, and display the processed image on a screen. Particularly, the display apparatus 110 may process left and right eye images while referring to a format of the 3D image, and display the processed left and right eye images alternately in a time-sharing manner.

The 3D glass 120 may be embodied as a passive type of polarizing glasses in which left and right eye glasses have different polarizations, or an active type of shutter glasses.

Moreover, the 3D image providing system according to an exemplary embodiment may further include a camera (not shown) for producing a 3D image.

The camera, as a kind of photographing device for producing a 3D image, produces a left eye image photographed to be provided to a left eye of a user, and a right eye image photographed to be provided to a right eye of the user. That is, the 3D image includes the left and right eye images, and these left and right eye images generate a 3D effect by a binocular disparity while being alternatively provided to the left and right eyes of the user, respectively.

For this, the camera includes a left eye camera for producing the left eye image and a right eye camera for producing the right eye image, and a space between the left eye camera and the right eye camera is determined in consideration of a space between two eyes of a human being.

The camera transmits the photographed left and right eye images to the display apparatus 110. Particularly, the left and right eye images, which are transmitted to the display apparatus 110 from the camera, may be transmitted in a format in which one of the left eye image and the right eye image in included in one frame or both the left eye image and the right eye image are included in one frame.

The camera may predetermine one of various formats of 3D images in advance, and generate the 3D image according to the determined format to transmit to the display apparatus 110.

A shutter glasses controller (not shown) which controls the 3D glasses 120, i.e., shutter glasses, may be included in the display apparatus 110, though it is understood that another exemplary embodiment is not limited thereto. For example, according to another exemplary embodiment, the shutter glasses controller may be omitted (e.g., in the case of passive type glasses) or may be formed separately from the display apparatus 110.

Hereinafter, a liquid crystal display (LCD) apparatus will be described as an example of a display apparatus 110 for convenience of explanation, though it is understood that another exemplary embodiment is not limited thereto. For example, the display apparatus according to another exemplary embodiment may be any of various display apparatus such as a cathode ray tube (CRT) display, a plasma display panel (PDP), an electroluminescent display (ELD), a light emitting diode (LED) display, an organic light emitting diode (OLED) display, an active-matrix organic light emitting diode (AMOLED) display, a field emission display (FED), etc.

Figure 2:
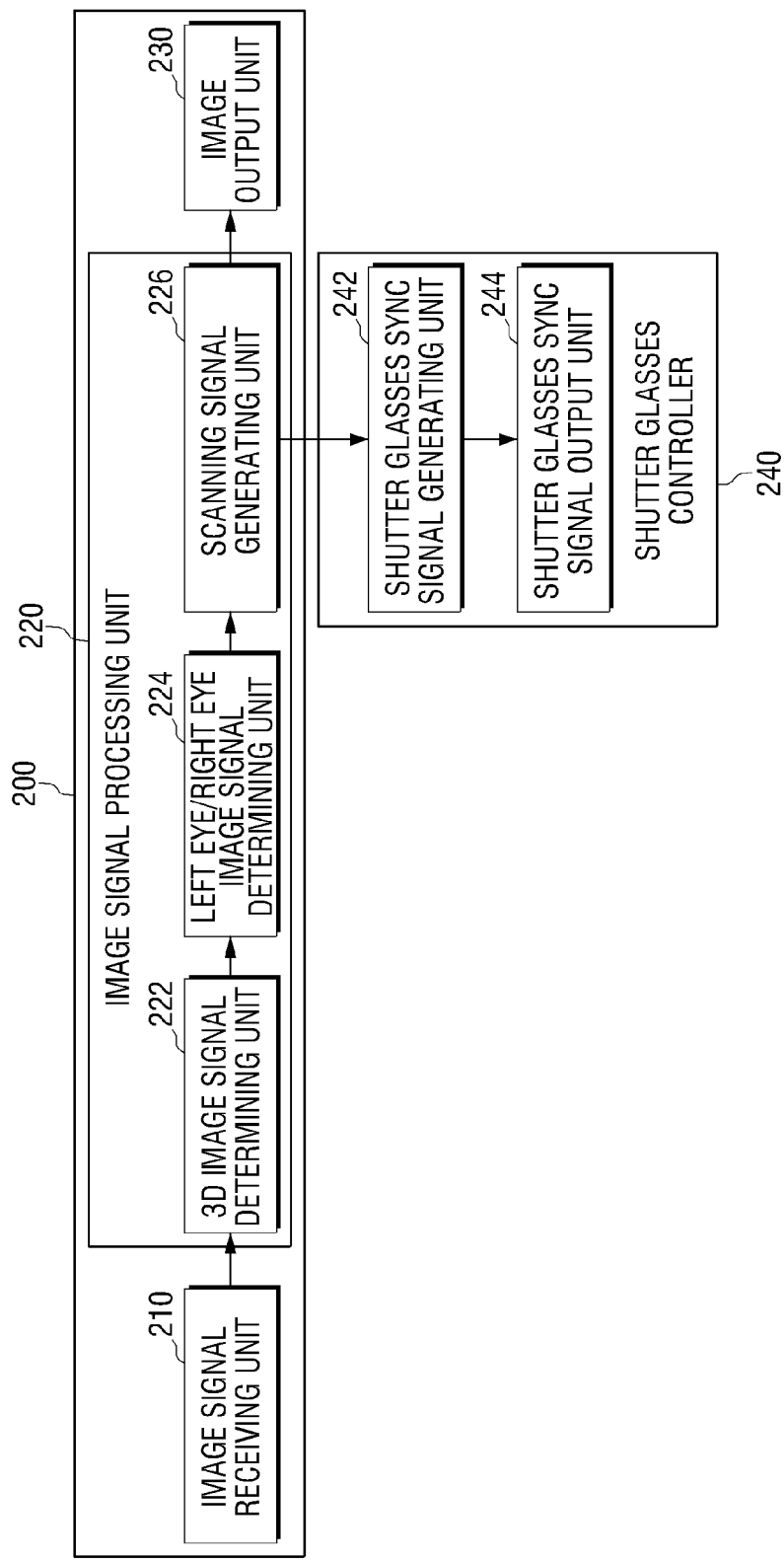
FIG. 2 is a schematic block diagram of a display apparatus according to an exemplary embodiment.

FIG. 2 is a schematic block diagram of a display apparatus 200 according to an exemplary embodiment. As illustrated in FIG. 2, the display apparatus 200 includes an image signal receiving unit 210, an image signal processing unit 220, and an image output unit 230. Meanwhile, the display apparatus 200 is connected to a shutter glasses controller 240 via wire or wirelessly. In the present exemplary embodiment, the shutter glasses controller 240 which controls shutter glasses is external to the display apparatus 200.

The image signal receiving unit 210 receives a 2D image signal or a 3D image signal. For example, the image signal receiving unit 210 may receive an image signal through a graphic card, and the image signal may be an image signal provided by an external apparatus such as an image photographing apparatus, a USB memory apparatus, etc. Meanwhile, if a 3D driving operation is selected by a user through a 3D driving selection user interface (UI), the image signal receiving unit 210 may assume that the received image signal is a 3D image signal even if the received image signal is a 2D image signal.

The image signal processing unit 220 generates a scanning signal for scanning left and right eye signals of an image signal received from the image signal receiving unit 210 alternately, and for scanning part of the left or the right eye image signal between a section for scanning the left eye image signal and a section for scanning the right eye image signal. As illustrated in FIG. 2, the image signal processing unit 220 includes a 3D image signal determining unit 222, a left/right eye image signal determining unit 224, and a scanning signal generating unit 226.

The 3D image signal determining unit 222 determines whether an image signal received from the image signal receiving unit 210 is a 2D image signal or a 3D image signal.

If it is determined that the received image signal is a 3D image signal by the 3D image signal determining unit 222, the left/right eye image signal determining unit 224 determines whether the 3D image signal is a left eye image signal or a right eye image signal.

In other words, the 3D image signal determining unit 222 determines whether the received 3D image signal is an image corresponding to a left eye or an image corresponding to a right eye in the case when the received image signal is divided into left eye (L) and right eye (R) image signals.

The scanning signal generating unit 226 generates a scanning signal for scanning part of a horizontal line of a left eye image signal or a right eye image signal between a section for scanning the left eye image signal and a section for scanning the right eye image signal.

Herein, the scanning signal may be a scanning signal for scanning part of the left eye image signal or part of the right eye image signal between a pair of VBIs.

That is, the scanning signal according to an exemplary embodiment may be a scanning signal for scanning part of the left eye image signal or part of the right eye image signal between a pair of VBIs, which is between a section for scanning the left eye image signal and a section for scanning the right eye image signal.

Hereinafter, for convenience of explanation, the frequency of an input image signal is assumed to be 120 Hz, the bandwidth of a section for scanning an output image signal of a left eye image signal or a right eye image signal is assumed to be 180 Hz, and the bandwidth of a section for scanning part of the left eye image signal and part of the right eye image signal is assumed to be 360 Hz. However, another exemplary embodiment is not limited thereto. That is, the frequency of an input image may be any of 60 Hz, 120 Hz, 175 Hz, 180 Hz, 240 Hz, etc., and the bandwidth of a section for scanning an output image signal may also vary.

According to an exemplary embodiment, part of a left eye image signal or part of a right eye image signal may be an image signal corresponding to a scope allowed by the bandwidth of the display apparatus 200.

For example, the part of the left eye image signal or the part of the right eye image signal may be horizontal line signals of the left eye image signal or horizontal line signals of the right eye image signal corresponding to the bandwidth of the display apparatus until the bandwidth becomes 360 Hz.

In other words, the part of the left eye image signal or the part of the right eye image signal may be an image signal corresponding to horizontal lines from a first horizontal line of the image signal sequentially to a horizontal line in a scope which is allowed by the bandwidth of the display apparatus 200.

According to another exemplary embodiment, the part of the left eye image signal or the part of the right eye image signal may be an image signal corresponding to horizontal lines from a next horizontal line of the image signal in the previously described exemplary embodiment and onwards, and corresponding to a scope allowed by the bandwidth of the display apparatus 200.

According to yet another exemplary embodiment, at least one of the part of the left eye image signal and the part of the right eye image signal may be even number line signals or odd number line signals of the corresponding image signal.

In other words, the part of the left eye image signal or the part of the right eye image signal may be a signal corresponding to the even number lines or the odd number lines of the corresponding image signal.

Meanwhile, in the present exemplary embodiment, if the part of the left eye image signal or the part of the right eye image signal, specifically in one of consecutive frames, is a signal corresponding only to odd number lines, the part of the left eye image signal or the part of the right eye image signal in the next frame may be a signal corresponding to even number lines. In addition, from the next frame, the part of the left eye image signal or the part of the right eye image signal may be a signal corresponding only to odd number lines or even number lines alternately.

According to another exemplary embodiment, the part of the left eye image signal or the part of the right eye image signal may be a line signal which is selected randomly from among horizontal scanning lines of a corresponding image signal.

In other words, the part of the left eye image signal or the part of the right eye image signal may be a line signal which is selected randomly from among the horizontal scanning lines of an image signal corresponding to the left eye image signal or the right eye image signal.

According to still another exemplary embodiment, the part of the left eye image signal or the part of the right eye image signal may be a signal where change in a screen is greater than a predetermined reference value in a corresponding image signal. In other words, only the image signal corresponding to the lines with significant change in the screen is scanned.

According to another exemplary embodiment, the part of the left eye image signal or the part of the right eye image signal may be a signal where change in the screen is less than a predetermined reference value in a corresponding image signal. In other words, only the image signal corresponding to the lines with little change in the screen is scanned.

According to yet another exemplary embodiment, the part of the left eye image signal or the part of the right eye image signal may be a signal corresponding to a central area that a user focuses on the screen. In other words, only the image signal corresponding to the lines that the user watches most frequently is scanned.

Meanwhile, the part of the left eye image signal or the part of the right eye image signal may downscale at least one of the left eye image signal and the right eye image signal to an even number line signal or an odd number line signal of the corresponding image signal, or may include correction image information for correcting a charge rate of a liquid crystal by filtering the left eye image signal or the right eye image signal.

In this case, the correction image information is included because, if an LCD applies a scanning signal of an image signal to a panel unit, the gate driver of the panel unit drives a horizontal line of the liquid crystal for every frame and a source driver applies a grayscale value of a corresponding pixel to a vertical line to be displayed from among the horizontal lines being driven. In this case, the source driver may reset the applied grayscale value of the corresponding pixel for each frame and apply a new grayscale value.

However, as the charge rate of the liquid crystal may not be perfect, there could be a difference between the grayscale value which is actually displayed by the panel unit and the grayscale value which is applied to the panel unit. According to an exemplary embodiment, however, when the grayscale value of a corresponding pixel to be displayed for each frame is applied, the grayscale value of a charged liquid crystal in the previous frame is not reset. Rather, correction image information for correcting a displayed grayscale value of the corresponding pixel in the previous frame may be included in part of a left eye image signal or part of a right eye image signal.

In an exemplary embodiment, the image signal processing unit 220 may generate an output Vsync signal corresponding to an image signal and a scanning signal which is divided into a section for scanning a left eye image signal, a section for scanning part of the left eye image signal, a section for scanning a right eye image signal, and a section for scanning part of the right eye image signal according to the generated output Vsync signal.

Specifically, the image signal processing unit 220 regenerates the output Vsync signal according to a received input Vsync, divides a scanning section into four sections according to the regenerated Vsync signal, and generates a scanning signal for sequentially scanning each of the left eye image signal, part of the left eye image signal, the right eye image signal, and part of the right eye image signal for each section.

The image output unit 230 displays an image signal according to the scanning signal generated by the image signal processing unit 220. For example, if the image signal received from the image signal receiving unit 210 is a 2D image signal, the image output unit 230 displays the 2D image on an LCD panel according to a general 2D image signal, and if the received image signal is a 3D image signal, the image output unit 230 processes the 3D image signal as described above and displays the 3D image on the LCD panel.

The shutter glasses controller 240 is external to the display apparatus 200. As illustrated in FIG. 2, the shutter glasses controller 240 includes a shutter glasses sync signal generating unit 242 and a shutter glasses sync signal output unit 244.

The shutter glasses sync signal generating unit 242 generates a shutter glasses sync signal for turning on a left shutter of shutter glasses when a section for scanning part of a left eye image signal starts, turning off the left shutter of the shutter glasses when the section for scanning part of the left eye image signal ends, turning on a right shutter of the shutter glasses when a section for scanning part of a right eye image signal starts, and turning off the right shutter of the shutter glasses when the section for scanning part of the right eye image signal ends.

Accordingly, the shutter glasses sync signal generating unit 242 may allow the left eye image signal and the right eye image signal to be recognized exactly by the left eye and the right eye respectively by turning on and off the left shutter of the shutter glasses in a section for scanning part of the left eye image signal and turning on and off the right shutter of the shutter glasses in a section for scanning part of the right eye image signal.

According to another exemplary embodiment, the shutter glasses sync signal generating unit 242 may not turn on the left shutter or the right shutter of the shutter glasses only in sections for scanning part of the left eye image signal or part of the right eye image. Instead, the shutter glasses sync signal generating unit 242 may generate a shutter glasses sync signal for turning on the shutter of a corresponding image signal at a point of time when a first VBI section starts in a pair of VBI sections located in each side of a scanning signal for scanning part of the left eye image signal or part of the right eye image signal, and turning off the shutter of a corresponding image signal at a point of time when the next VBI section ends.

The shutter glasses sync signal output unit 244 modulates a shutter glasses sync signal generated by the shutter glasses sync signal generating unit 242, for example, to an infrared (IR) signal or a radio frequency (RF) signal and outputs the IR signal or the RF signal.

In other words, the shutter glasses sync signal output unit 244 modulates the shutter glasses sync signal generated by the shutter glasses sync signal generating unit 242 to a signal to be transmitted to the shutter glasses and transmits the modulated signal to the shutter glasses.

Figure 3:
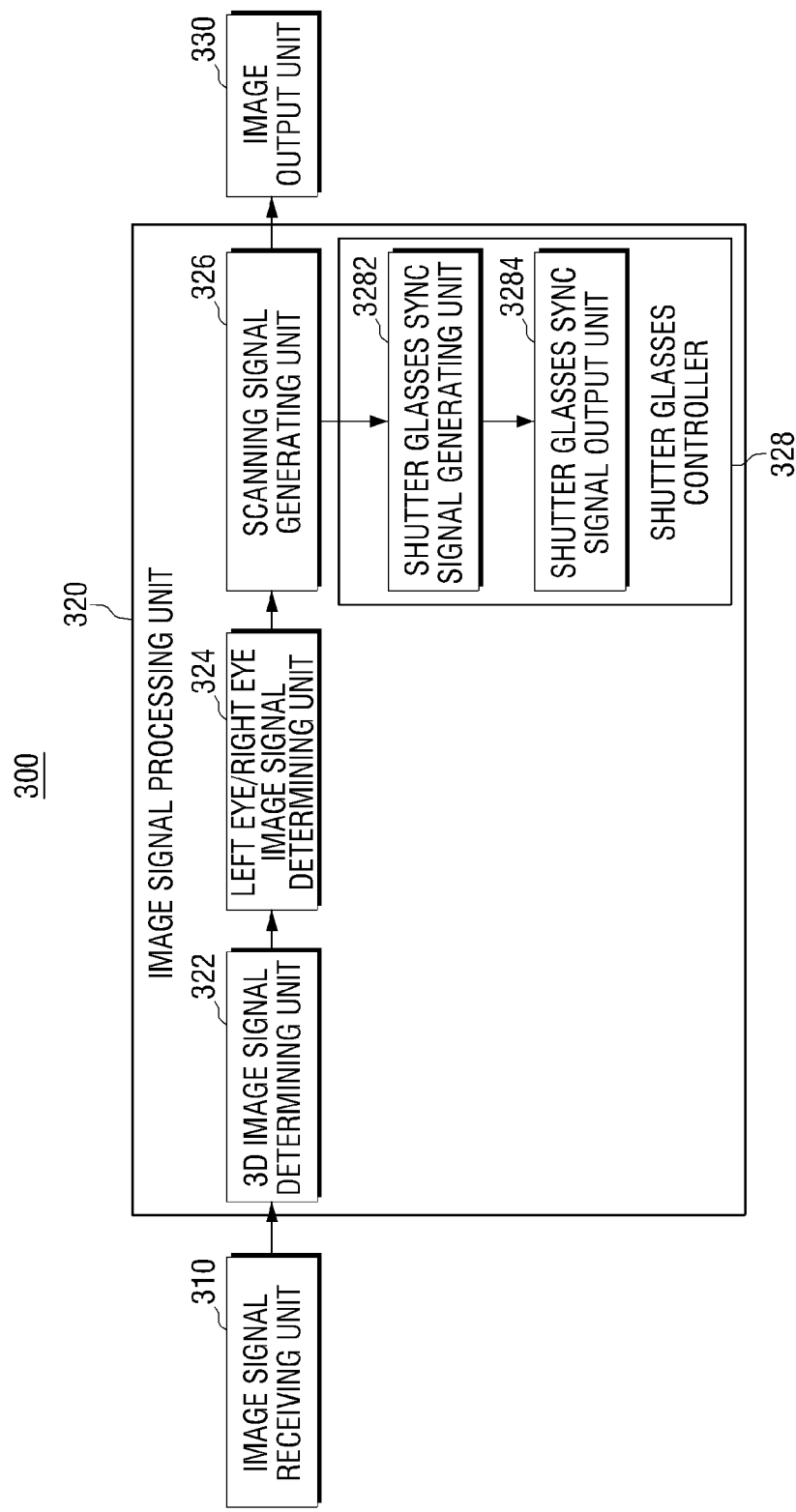
FIG. 3 is a schematic block diagram of a display apparatus according to another exemplary embodiment.

FIG. 3 is a schematic block diagram of a display apparatus 300 according to another exemplary embodiment. As illustrated in FIG. 3, the display apparatus 300 includes an image signal receiving unit 310, an image signal processing unit 320, and an image output unit. In the present exemplary embodiment, the display apparatus 300 integrally includes a shutter glasses controller 328 for controlling shutter glasses. Since the components in FIG. 3 are similar to those described above with reference to FIG. 2, detailed descriptions are omitted herein.

The image single receiving unit 310 receives a 2D image signal or a 3D image signal. If a 3D driving operation is selected by a user through a 3D driving selection UI, the image signal receiving unit 310 may assume that a received image signal is a 3D image signal even if the received image signal is a 2D image signal.

The image signal processing unit 320 generates a scanning signal for scanning the left and right eye signals of an image signal received from the image signal receiving unit 310 alternately, and for scanning part of the left or the right eye image signal between a section for scanning the left eye image signal and a section for scanning the right eye image signal. As illustrated in FIG. 2, the image signal processing unit 320 includes a 3D image signal determining unit 322, a left/right eye image signal determining unit 324, and a scanning signal generating unit 326, and a shutter glasses controller 328.

The 3D image signal determining unit 322 determines whether an image signal received from the image signal receiving unit 210 is a 2D image signal or a 3D image signal.

If it is determined that the received image signal is a 3D image signal by the 3D image signal determining unit 222, the left/right eye image signal determining unit 324 determines whether the 3D image signal is a left eye image signal or a right eye image signal.

In other words, the 3D image signal determining unit 322 determines whether the received 3D image signal is an image corresponding to a left eye or an image corresponding to a right eye in the case when the received image signal is divided into left eye (L) and right eye (R) image signals.

The scanning signal generating unit 326 generates a scanning signal for scanning part of a horizontal line of a left eye image signal or a right eye image signal between a section for scanning the left eye image signal and a section for scanning the right eye image signal.

Herein, the scanning signal may be a scanning signal for scanning part of the left eye image signal or part of the right eye image signal between a pair of VBIs.

According to an exemplary embodiment, part of a left eye image signal or part of a right eye image signal may be an image signal corresponding to a scope allowed by the bandwidth of the display apparatus 300.

According to another exemplary embodiment, the part of the left eye image signal or the part of the right eye image signal may be an image signal corresponding to horizontal lines from a next horizontal line of the image signal in the previously described exemplary embodiment and onwards, and corresponding to a scope allowed by the bandwidth of the display apparatus 300.

According to yet another exemplary embodiment, at least one of the left eye image signal and the right eye image signal may be an even number line signal or an odd number line signal of the corresponding image signal.

Meanwhile, in the present exemplary embodiment, if the part of the left eye image signal or the part of the right eye image signal, specifically in one of consecutive frames, is a signal corresponding only to an odd number line, the part of the left eye image signal or the part of the right eye image signal in the next frame may be a signal corresponding to an even number line. In addition, from the next frame, the part of the left eye image signal or the part of the right eye image signal may be a signal corresponding only to an odd number line or an even number line alternately.

According to another exemplary embodiment, the part of the left eye image signal or the part of the right eye image signal may be a line signal which is selected randomly from among horizontal scanning lines of a corresponding image signal.

According to still another exemplary embodiment, the part of the left eye image signal or the part of the right eye image signal may be a signal where change in a screen is greater than a predetermined reference value in a corresponding image signal.

According to another exemplary embodiment, the part of the left eye image signal or the part of the right eye image signal may be a signal where change in the screen is less than a predetermined reference value in a corresponding image signal.

According to yet another exemplary embodiment, the part of the left eye image signal or the part of the right eye image signal may be a signal corresponding to a central area that a user focuses on the screen. In this case, only the image signal corresponding to the lines that the user watches most frequently is scanned.

Meanwhile, the part of the left eye image signal or the part of the right eye image signal may downscale at least one of the left eye image signal and the right eye image signal to an even number line signal or an odd number line signal of the corresponding image signal, or may include correction image information for correcting a charge rate of a liquid crystal by filtering the left eye image signal or the right eye image signal.

In this case, the correction image information is included because, if an LCD applies a scanning signal of an image signal to a panel unit, the gate driver of the panel unit drives a horizontal line of the liquid crystal for every frame and a source driver applies a grayscale value of a corresponding pixel to a vertical line to be displayed from among the horizontal lines being driven. In this case, the source driver may reset the applied grayscale value of the corresponding pixel for each frame and apply a new grayscale value.

However, as the charge rate of the liquid crystal may not be perfect, there could be a difference between the grayscale value which is actually displayed by the panel unit and the grayscale value which is applied to the panel unit. According to an exemplary embodiment, however, when the grayscale value of a corresponding pixel to be displayed for each frame is applied, the grayscale value of a charged liquid crystal in the previous frame is not reset. Rather, correction image information for correcting a displayed grayscale value of the corresponding pixel in the previous frame may be included in part of a left eye image signal or part of a right eye image signal.

In an exemplary embodiment, the image signal processing unit 320 may generate an output Vsync signal corresponding to an image signal and a scanning signal which is divided into a section for scanning a left eye image signal, a section for scanning part of the left eye image signal, a section for scanning a right eye image signal, and a section for scanning part of the right eye image signal according to the generated output Vsync signal.

Specifically, the image signal processing unit 320 regenerates the output Vsync signal according to a received input Vsync, divides a scanning section into four sections according to the regenerated Vsync signal, and generates a scanning signal for sequentially scanning each of the left eye image signal, part of the left eye image signal, the right eye image signal, and part of the right eye image signal for each section.

The image output unit 330 displays an image signal according to the scanning signal generated by the image signal processing unit 320. For example, if the image signal received from the image signal receiving unit 310 is a 2D image signal, the image output unit 330 displays the 2D image on an LCD panel according to a general 2D image signal, and if the received image signal is a 3D image signal, the image output unit 330 processes the 3D image signal as described above and displays the 3D image on the LCD panel.

The shutter glasses controller 328 is provided inside the display apparatus 300. As illustrated in FIG. 3, the shutter glasses controller 328 includes a shutter glasses sync signal generating unit 3282 and a shutter glasses sync signal output unit 3284.

The shutter glasses sync signal generating unit 3282 generates a shutter glasses sync signal for turning on a left shutter of shutter glasses when a section for scanning part of a left eye image signal starts, turning off the left shutter of the shutter glasses when a section for scanning part of the left eye image signal ends, turning on a right shutter of the shutter glasses when a section for scanning part of a right eye image signal starts, and turning off the right shutter of the shutter glasses when a section for scanning part of the right eye image signal ends.

Accordingly, the shutter glasses sync signal generating unit 3282 may allow the left eye image signal and the right eye image signal to be recognized exactly by the left eye and the right eye respectively by turning on and off the left shutter of the shutter glasses in a section for scanning part of the left eye image signal and turning on and off the right shutter of the shutter glasses in a section for scanning part of the right eye image signal.

According to another exemplary embodiment, the shutter glasses sync signal generating unit 3282 may not turn on the left shutter or the right shutter of the shutter glasses only in section for scanning part of the left eye image signal or part of the right eye image. Instead, the shutter glasses sync signal generating unit 242 may generate a shutter glasses sync signal for turning on the shutter of a corresponding image signal at a point of time when a first VBI section starts in a pair of VBI sections located in each side of a scanning signal for scanning part of the left eye image signal or part of the right eye image signal, and turning off the shutter of a corresponding image signal at a point of time when the next VBI section ends.

The shutter glasses sync signal output unit 3284 modulates a shutter glasses sync signal generated by the shutter glasses sync signal generating unit 3282, for example, to an IR signal or an RF signal and outputs the IR signal or the RF signal.

The image output unit 330 displays a 3D image according to a scanning signal generated by the image signal processing unit 320. For example, if the image signal received from the image signal receiving unit 310 is a 2D image signal, the image output unit 330 displays the 2D image on an LCD panel according to a general 2D image signal, and if the received image signal is a 3D image signal, the image output unit 330 processes the 3D image signal as described above and displays the 3D image on the LCD panel.

Figure 4:
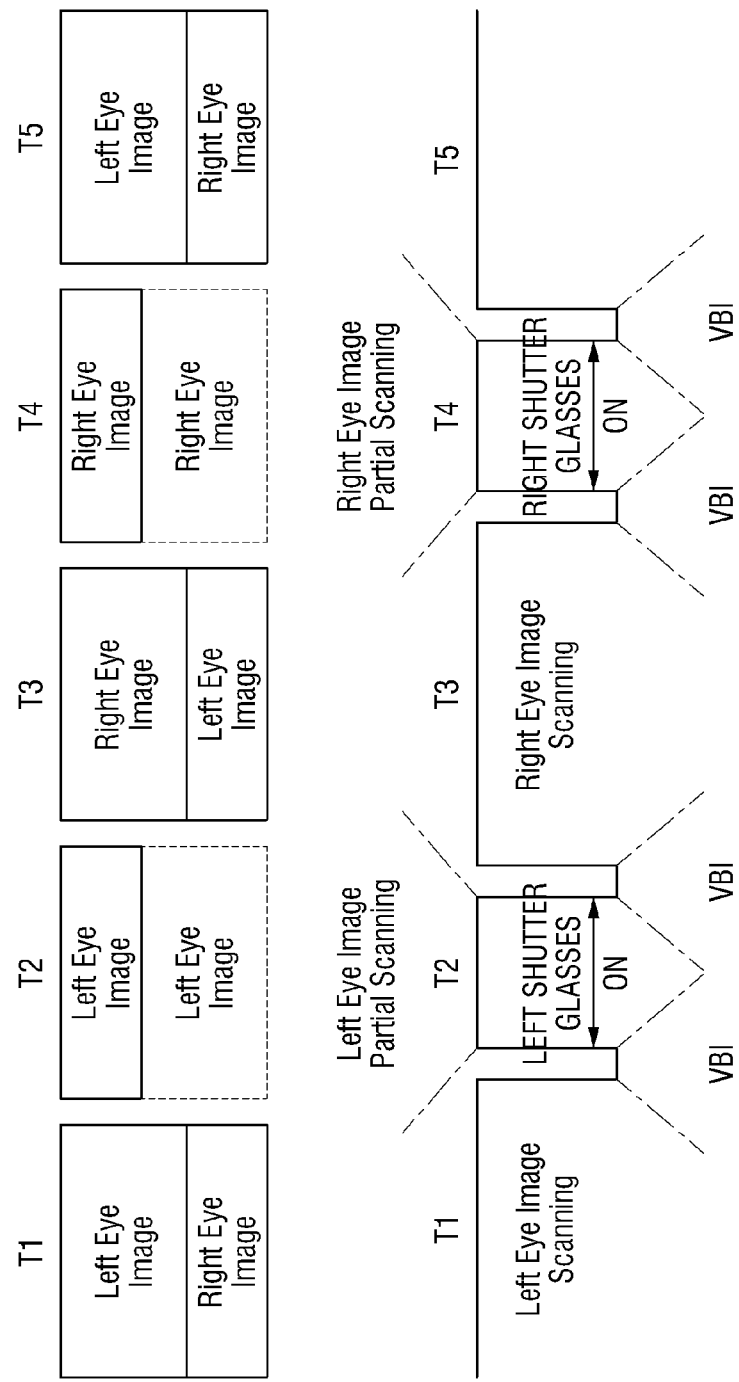
FIG. 4 is a view to explain a method of scanning a left eye image signal and a right eye image signal in a display apparatus according to an exemplary embodiment.

FIG. 4 is a view to explain a method of scanning a left eye image signal and a right eye image signal in a display apparatus according to an exemplary embodiment.

As illustrated in FIG. 4, as time elapses, if an entire left eye image is scanned in T1, the left eye image and the right eye image are displayed together, if only part of the left eye image is scanned in T2, only part of the left eye image is displayed, if an entire right eye image is scanned in T3, the left eye image and the right eye image are displayed together, and if only part of the right eye image is scanned in T4, only part of the right eye image is displayed. In addition, as the above processes are repeated after T4, the display apparatus according to various exemplary embodiments, may provide stereoscopic 3D image by allowing the left eye image signal and the right eye image signal to be recognized exactly by the left eye and the right eye, respectively.

Figure 5:
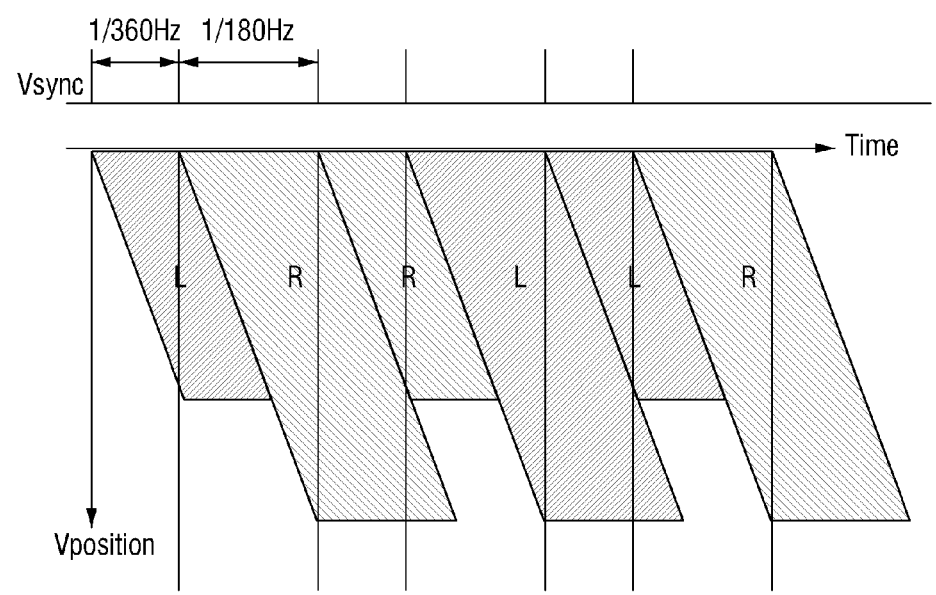
FIGS. 5 and 6 are views to explain a method of scanning part of an image signal including correction image information in a display apparatus according to various exemplary embodiments.
Figure 6:
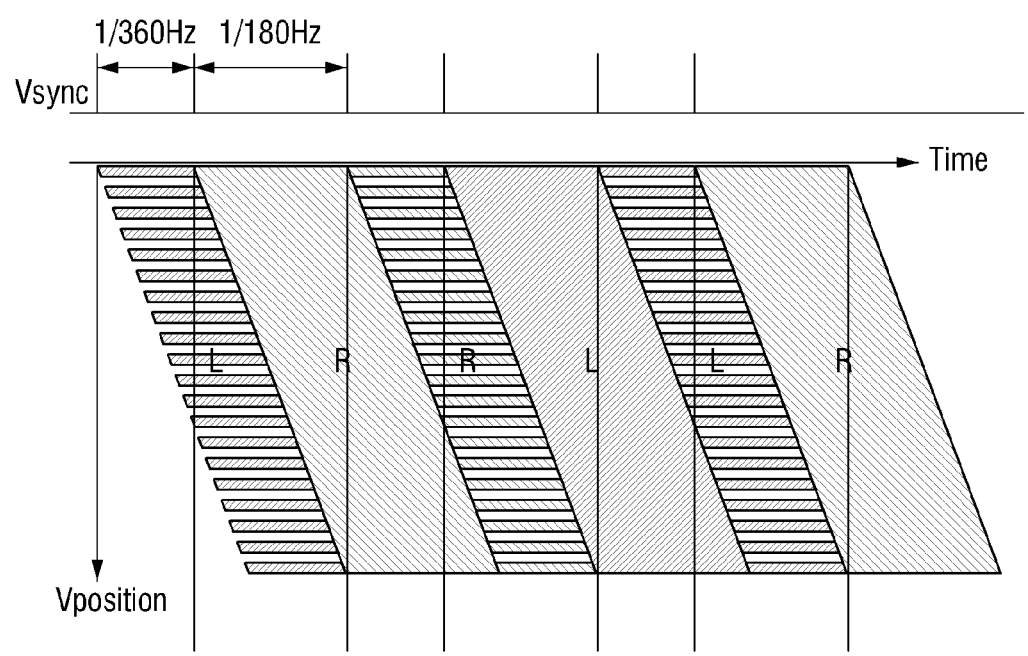

FIGS. 5 and 6 are views to explain a method of scanning part of an image signal including correction image information in a display apparatus according to various exemplary embodiments.

As illustrated in FIG. 5, in the display apparatus, when part of a left eye image signal or part of a right eye image signal including correction image information for correcting the charge rate of a liquid crystal is scanned, part of the original left eye image or part of the original right eye image may be simply filtered and the filtered image signal may be scanned repeatedly.

Referring to FIG. 6, in the display apparatus, when part of a left eye image signal or part of a right eye image signal including correction image information for correcting the charge rate of a liquid crystal is scanned, an image signal where the original left eye image or the original right eye image is decimated to an even number line or an odd number line may be scanned repeatedly.

Specifically, according to a method of scanning an image signal in FIG. 6, if a frequency of an input image signal is 120 Hz, a frame rate of a first right eye image signal may be upgraded to a 180 Hz image signal and output in an image board, and if a second right eye image signal is output, the first right eye image signal may be decimated to an even line or an odd line signal and a frame rate of the decimated right eye image signal may be upgraded to a 360 Hz image signal and output in the image board. In addition, a frame rate of a third left eye image signal may be upgraded to a 180 Hz image signal and output in the image board, and if a second right eye image signal is output, the third right eye image signal may be decimated to an even line or an odd line signal and a frame rate of the decimated right eye image signal may be upgraded to a 360 Hz image signal and output in the image board.

In this case, as the second and the fourth image signals are charged only in an even line or an odd line pixel of a liquid crystal, the second and fourth image signals are displayed flatly on a full screen. When an even line pixel or an odd line pixel starts to be charged, a left shutter or a right shutter of shutter glasses may be turned on respectively.

In addition, as illustrated in FIGS. 5 and 6, the display apparatus, according to various exemplary embodiments, may scan an image signal by dividing a scanning section into a section for scanning a left eye image signal, a section for scanning part of the left eye image signal, a section for scanning a right eye image signal, and a section for scanning part of the right eye image signal according to an output Vsync signal. As scanning starts from an upper most horizontal line, delay may occur in a V position, delaying scanning as time elapses.

The display apparatus, according to various exemplary embodiments, may resolve crosstalk, which is interference among pixels, or correct an imperfect charge rate of a liquid crystal by using correction image information.

Figure 7:
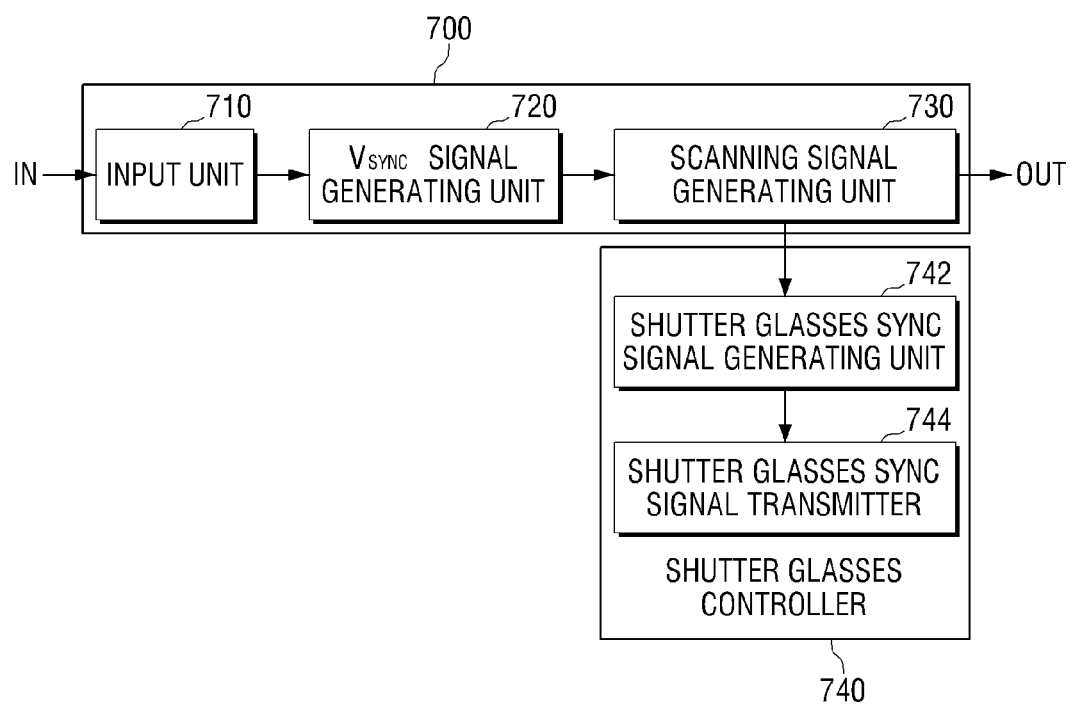
FIG. 7 is a schematic block diagram of an image processing apparatus according to an exemplary embodiment.

FIG. 7 is a schematic block diagram of an image processing apparatus 700 according to an exemplary embodiment. As illustrated in FIG. 7, the image processing apparatus 700 includes an input unit 710, a Vsync signal generating unit 720, and a scanning signal generating unit 730. Meanwhile, the image processing apparatus 700 is connected to the shutter glasses controller 740 via wire or wirelessly, and the shutter glasses controller 740 which controls shutter glasses is external to the image processing apparatus 700.

In addition, the image processing apparatus 700 may correspond to an image board in a display apparatus. In this case, a scanning signal generated by the image processing apparatus 700 is transmitted to a panel board of the display apparatus. For example, the panel board may include a timing controller (TCON), a gate driver, a source driver, an LCD panel, etc.

Low voltage difference signaling (LVDS) may be used as an example of an interface standard between the image processing apparatus 700 and the panel board. However, it is understood that another exemplary embodiment is not limited thereto, and various interfaces may be used.

The input unit 710 receives an image signal and a Vsync signal.

In particular, the input unit of the image processing apparatus 700, according to an exemplary embodiment, may receive a 2D image signal or a 3D image signal through, for example, a graphic card, and the image signal may be an image signal provided by an external apparatus such as an image photographing apparatus, a USB memory apparatus, etc.

In an exemplary case, if a 3D driving operation is selected by a user through a 3D driving selection UI, the input unit 710 may recognize a received image signal as a 3D image signal even if the received image signal is a 2D image signal.

The Vsync signal generating unit 720 generates an output Vsync signal based on a Vsync signal input through the input unit 710.

Hereinafter, for convenience of explanation, the frequency of an input image signal is assumed to be 120 Hz, a bandwidth of a section for scanning an output image signal of a left eye image signal or a right eye image signal is assumed to be 180 Hz, and the bandwidth of a section for scanning part of the left eye image signal and part of the right eye image signal is assumed to be 360 Hz for convenience of explanation. However, another exemplary embodiment is not limited thereto. That is, according to another exemplary embodiment, the frequency of an input image may be any of 60 Hz, 120 Hz, 175 Hz, 180 Hz, 240 Hz, etc., and the bandwidth of a section for scanning an output image signal may also vary.

In an exemplary embodiment, the Vsync signal generating unit 720 generates a first Vsync signal and a second Vsync signal based on the input Vsync signal.

In other words, the Vsync signal generating unit 720 regenerates a period of the input Vsync signal. For example, if a Vsync signal with 1/120 Hz is input, the period between a second output Vsync signal and a first output Vsync signal may be regenerated as 1/180 Hz, and the period between the first output Vsync signal and the second output Vsync signal may be regenerated as 1/360 Hz.

The scanning signal generating unit 730 generates a scanning signal for scanning part of an image signal in one of sections that are divided according to an output Vsync signal generated by the Vsync signal generating unit 720.

Meanwhile, if the Vsync signal generating unit 720 generates a first output Vsync signal and a second output Vsync signal, the scanning signal generating unit 730 may generate a first scanning signal for scanning a left eye image signal or a right eye image signal of an image signal according to the first output Vsync signal, and a second scanning signal for scanning part of the image signal according to the second output Vsync signal.

For example, if the period between the second output Vsync signal and the first output Vsync signal is 1/180 Hz, the scanning signal generating unit 730 may generate the first scanning signal of 1/180 Hz according to the first output Vsync signal, and if the period between the first output Vsync signal and the second output Vsync signal is 1/360 Hz, the scanning signal generating unit 730 may generate the second scanning signal of 1/360 Hz according to the second output Vsync signal.

In this case, frame rates of the first scanning signal and the second scanning signal may be greater than a frame rate of an input image signal.

Such a greater frame rate is because the scanning signal generating unit 730 increases the frame rate of the first scanning signal for scanning a left eye image signal or a right eye image signal of an input image signal with a frame rate of 120 Hz to 180 Hz, and increases the frame rate of the second scanning signal for scanning part of the image signal to 360 Hz according to a frequency of an output Vsync signal generated by the Vsync signal generating unit 720.

In an exemplary embodiment, the scanning signal generating unit 730 may downscale at least one of part of a left eye image signal or part of a right eye image signal of an image signal to an even number line signal or an odd number line signal, or may include correction image information for correcting the charge rate of a liquid crystal by filtering the left eye image signal or the right eye image signal.

In this case, the correction image information may be included because, if an LCD applies a scanning signal of an image signal to a panel unit, the gate driver of the panel unit drives a horizontal line of the liquid crystal for every frame and a source driver applies a grayscale value of a corresponding pixel to a vertical line to be displayed from among the horizontal lines being driven. In this case, the source driver may reset the applied grayscale value of the corresponding pixel for each frame and apply a new grayscale value.

However, as the charge rate of the liquid crystal may not be perfect, there could be a difference between the grayscale value which is actually displayed by the panel unit and the grayscale value which is applied to the panel unit. According to an exemplary embodiment, however, when the grayscale value of a corresponding pixel to be displayed for each frame is applied, the grayscale value of a charged liquid crystal in the previous frame is not reset. Rather, correction image information for correcting a displayed grayscale value of the corresponding pixel in the previous frame may be included in part of an image signal.

According to an exemplary embodiment, part of a left eye image signal or part of a right eye image signal may be an image signal in a scope which is allowed by the bandwidth of the image processing apparatus 700.

For example, the part of the image signal may be horizontal line signals of the image signal until the bandwidth becomes 360 Hz.

In other words, the part of the corresponding image signal may be an image signal corresponding to horizontal lines from a first horizontal line of the corresponding image signal sequentially to a horizontal line in a scope that is allowed by the bandwidth of the image processing apparatus 700.

According to another exemplary embodiment, the part of the left eye image signal or the part of the right eye image signal may be an image signal corresponding to horizontal lines from a next horizontal line of the image signal in the previously described exemplary embodiment and onwards, and corresponding to a scope allowed by the bandwidth of the image processing apparatus 700.

According to yet another exemplary embodiment, at least one of the left eye image signal and the right eye image signal may be an even number line signal or an odd number line signal of the corresponding image signal.

In other words, the part of the left eye image signal or the part of the right eye image signal may be a signal corresponding to the even number line or the odd number line of the corresponding image signal.

Meanwhile, in the present exemplary embodiment, if the part of the left eye image signal or the part of the right eye image signal, specifically in one of consecutive frames, is a signal corresponding only to an odd number line, the part of the left eye image signal or the part of the right eye image signal in the next frame may be a signal corresponding to an even number line. In addition, from the next frame, the part of the left eye image signal or the part of the right eye image signal may be a signal corresponding only to an odd number line or an even number line alternately.

According to another exemplary embodiment, the part of the left eye image signal or the part of the right eye image signal may be a line signal which is selected randomly from among horizontal scanning lines of a corresponding image signal.

In other words, the part of the left eye image signal or the part of the right eye image signal may be a line signal which is selected randomly from among the horizontal scanning lines of an image signal corresponding to the left eye image signal or the right eye image signal.

According to still another exemplary embodiment, the part of the left eye image signal or the part of the right eye image signal may be a signal where change in a screen is greater than a predetermined reference value in a corresponding image signal. In other words, only the image signal corresponding to the lines with significant change in the screen is scanned.

According to another exemplary embodiment, the part of the left eye image signal or the part of the right eye image signal may be a signal where change in the screen is less than a predetermined reference value in a corresponding image signal. In other words, only the image signal corresponding to the lines with little change in the screen is scanned.

According to yet another exemplary embodiment, the part of the left eye image signal or the part of the right eye image signal may be a signal corresponding to a central area that a user focuses on the screen. In other words, only the image signal corresponding to the lines that the user watches most frequently is scanned.

In the present exemplary embodiment, the shutter glasses controller 740 is external to the image processing apparatus 700. As illustrated in FIG. 7, the shutter glasses controller 740 includes a shutter glasses sync signal generating unit 742 and a shutter glasses sync signal output unit 744.

The shutter glasses sync signal generating unit 742 generates a shutter glasses sync signal for turning on a left shutter of shutter glasses when a section for scanning part of a left eye image signal starts, turning off the left shutter of the shutter glasses when a section for scanning part of the left eye image signal ends, turning on a right shutter of the shutter glasses when a section for scanning part of a right eye image signal starts, and turning off the right shutter of the shutter glasses when a section for scanning part of the right eye image signal ends.

Accordingly, the shutter glasses sync signal generating unit 742 may allow the left eye image signal and the right eye image signal to be recognized exactly by the left eye and the right eye respectively by turning on and off the left shutter of the shutter glasses in a section for scanning part of the left eye image signal and turning on and off the right shutter of the shutter glasses in a section for scanning part of the right eye image signal.

According to another exemplary embodiment, the shutter glasses sync signal generating unit 742 may not turn on the left shutter or the right shutter of the shutter glasses only in sections for scanning part of the left eye image signal or part of the right eye image. Rather, the shutter glasses sync signal generating unit 242 may generate a shutter glasses sync signal for turning on the shutter of a corresponding image signal at a point of time when a first VBI section starts in a pair of VBI sections located in each side of a scanning signal for scanning part of the left eye image signal or part of the right eye image signal, and turning off the shutter of a corresponding image signal at a point of time when the next VBI section ends.

The shutter glasses sync signal transmitter 744 modulates a shutter glasses sync signal generated by the shutter glasses sync signal generating unit 742, for example, to an IR signal or an RF signal and transmits the IR signal or the RF signal to the shutter glasses.

In other words, the shutter glasses sync signal transmitter 244 modulates the shutter glasses sync signal generated by the shutter glasses sync signal generating unit 742 to a signal to be transmitted to the shutter glasses and transmits the modulated signal to the shutter glasses.

Figure 8:
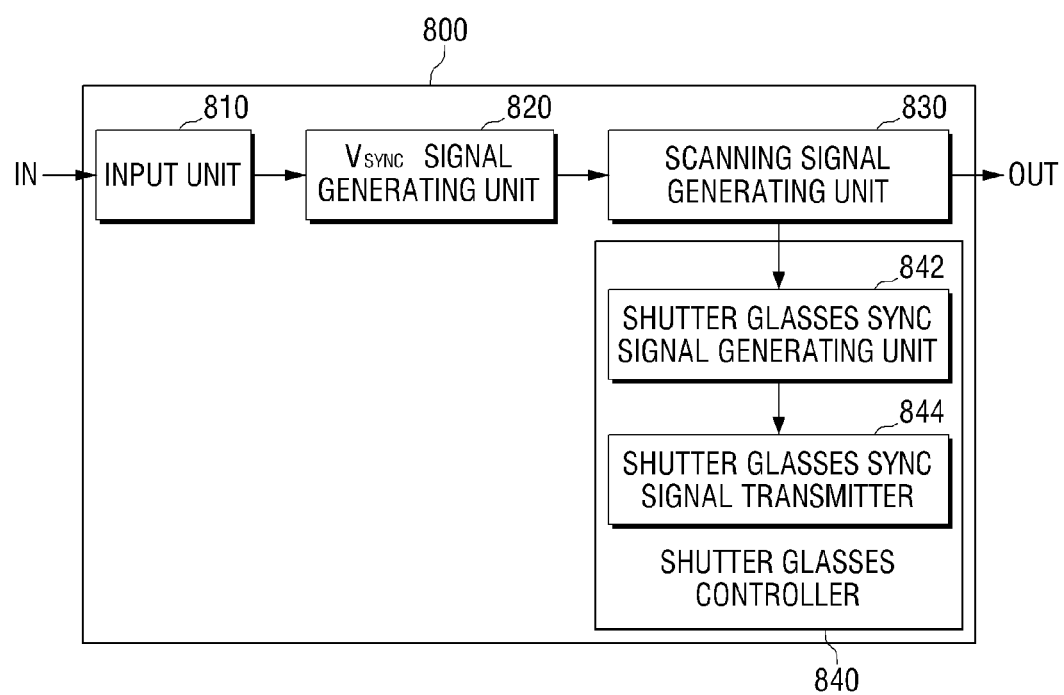
FIG. 8 is a schematic block diagram of an image processing apparatus according to another exemplary embodiment.

FIG. 8 is a schematic block diagram of an image processing apparatus 800 according to another exemplary embodiment. As illustrated in FIG. 8, the image processing apparatus 800 includes an input unit 810, a Vsync signal generating unit 820, a scanning signal generating unit 830, and a shutter glasses controller 840. In the present exemplary embodiment, the image processing apparatus 800 integrally includes a shutter glasses controller 840 for controlling shutter glasses. Since the components in FIG. 8 are similar to those described above with reference to FIG. 7, detailed descriptions are omitted herein.

The input unit 810 receives an image signal and a Vsync signal.

In particular, the input unit 810 of the image processing apparatus 800, according to another exemplary embodiment, may receive a 2D image signal or a 3D image signal through, for example, a graphic card, and the image signal may be an image signal provided by an external apparatus such as an image photographing apparatus, a USB memory apparatus, etc.

Meanwhile, if a 3D driving operation is selected by a user through a 3D driving selection UI, the input unit 810 assumes a received image signal as a 3D image signal even if the received image signal is a 2D image signal.

The Vsync signal generating unit 820 generates an output Vsync signal based on a Vsync signal input through the input unit 810.

In an exemplary embodiment, the Vsync signal generating unit 820 generates a first Vsync signal and a second Vsync signal based on the input Vsync signal.

The scanning signal generating unit 830 generates a scanning signal for scanning part of an image signal in one of sections that are divided according to an output Vsync signal generated by the Vsync signal generating unit 820.

For example, if the Vsync signal generating unit 820 generates a first output Vsync signal and a second output Vsync signal, the scanning signal generating unit 830 may generate a first scanning signal for scanning a left eye image signal or a right eye image signal of an image signal according to the first output Vsync signal, and a second scanning signal for scanning part of the image signal according to the second output Vsync signal.

In this case, frame rates of the first scanning signal and the second scanning signal may be greater than a frame rate of an input image signal.

In an exemplary embodiment, the scanning signal generating unit 830 may downscale at least one of part of a left eye image signal or part of a right eye image signal of an image signal to an even number line signal or an odd number line signal, or may include correction image information for correcting the charge rate of a liquid crystal by filtering the left eye image signal or the right eye image signal.

In this case, the correction image information may be included because, if an LCD applies a scanning signal of an image signal to a panel unit, the gate driver of the panel unit drives a horizontal line of the liquid crystal for every frame and a source driver applies a grayscale value of a corresponding pixel to a vertical line to be displayed from among the horizontal lines being driven. In this case, the source driver may reset the applied grayscale value of the corresponding pixel for each frame and apply a new grayscale value.

However, as the charge rate of the liquid crystal may not be perfect, there could be a difference between the grayscale value which is actually displayed by the panel unit and the grayscale value which is applied to the panel unit. According to an exemplary embodiment, however, when the grayscale value of a corresponding pixel to be displayed for each frame is applied, the grayscale value of a charged liquid crystal in the previous frame is not reset. Rather, correction image information for correcting a displayed grayscale value of the corresponding pixel in the previous frame may be included in part of an image signal.

According to an exemplary embodiment, part of a left eye image signal or part of a right eye image signal may be an image signal corresponding to a scope allowed by the bandwidth of the image processing apparatus 800.

In other words, the part of the image signal may be an image signal corresponding to horizontal lines from a first horizontal line of the image signal sequentially to a horizontal line in a scope that is allowed by the bandwidth of the image processing apparatus 800.

According to another exemplary embodiment, the part of the left eye image signal or the part of the right eye image signal may be an image signal corresponding to horizontal lines from a next horizontal line of the image signal in the previously described exemplary embodiment and onwards, and corresponding to a scope allowed by the bandwidth of the image processing apparatus 800.

According to yet another exemplary embodiment, at least the of a left eye image signal and the right eye image signal may be an even number line signal or an odd number line signal of the corresponding image signal.

In other words, the part of the left eye image signal or the part of the right eye image signal may be a signal corresponding to the even number line or the odd number line of the corresponding image signal.

Meanwhile, in the present exemplary embodiment, if the part of the left eye image signal or the part of the right eye image signal, specifically in one of consecutive frames, is a signal corresponding only to an odd number line, the part of the left eye image signal or the part of the right eye image signal in the next frame may be a signal corresponding to an even number line. In addition, from the next frame, the part of the left eye image signal or the part of the right eye image signal may be a signal corresponding only to an odd number line or an even number line alternately.

According to another exemplary embodiment, the part of the left eye image signal or the part of the right eye image signal may be a line signal which is selected randomly from among horizontal scanning lines of a corresponding image signal.

In other words, the part of the left eye image signal or the part of the right eye image signal may be a line signal which is selected randomly from among the horizontal scanning lines of an image signal corresponding to a left eye image signal or a right eye image signal.

According to still another exemplary embodiment, the part of the left eye image signal or the part of the right eye image signal may be a signal where change in a screen is greater than a predetermined reference value in a corresponding image signal. In other words, only the image signal corresponding to the lines with significant change in the screen is scanned.

According to another exemplary embodiment, the part of the left eye image signal or the part of the right eye image signal may be a signal where change in the screen is less than a predetermined reference value in a corresponding image signal. In other words, only the image signal corresponding to the lines with little change in the screen is scanned.

According to yet another exemplary embodiment, the part of the left eye image signal or the part of the right eye image signal may be a signal corresponding to a central area that a user focuses on the screen. In other words, only the image signal corresponding to the lines that the user watches most frequently is scanned.

The shutter glasses controller 840 is provided inside the image processing apparatus 800. As illustrated in FIG. 8, the shutter glasses controller 840 includes a shutter glasses sync signal generating unit 842 and a shutter glasses sync signal output unit 844.

The shutter glasses sync signal generating unit 842 generates a shutter glasses sync signal for turning on a left shutter of shutter glasses when a section for scanning part of a left eye image signal starts, turning off the left shutter of the shutter glasses when a section for scanning part of the left eye image signal ends, turning on a right shutter of the shutter glasses when a section for scanning part of a right eye image signal starts, and turning off the right shutter of the shutter glasses when a section for scanning part of the right eye image signal ends.

Accordingly, the shutter glasses sync signal generating unit 842 may allow the left eye image signal and the right eye image signal to be recognized exactly by the left eye and the right eye respectively by turning on and off the left shutter of the shutter glasses in a section for scanning part of the left eye image signal and turning on and off the right shutter of the shutter glasses in a section for scanning part of the right eye image signal.

According to another exemplary embodiment, the shutter glasses sync signal generating unit 842 may not turn on the left shutter or the right shutter of the shutter glasses only in section for scanning part of the left eye image signal or part of the right eye image. Instead, the shutter glasses sync signal generating unit 242 may generate a shutter glasses sync signal for turning on the shutter of a corresponding image signal at a point of time when a first VBI section starts in a pair of VBI sections located in each side of a scanning signal for scanning part of the left eye image signal or part of the right eye image signal, and turning off the shutter of a corresponding image signal at a point of time when the next VBI section ends.

The shutter glasses sync signal transmitter 844 modulates a shutter glasses sync signal generated by the shutter glasses sync signal generating unit 842, for example, to an IR signal or an RF signal and transmits the IR signal or the RF signal to the shutter glasses.

Figure 9:
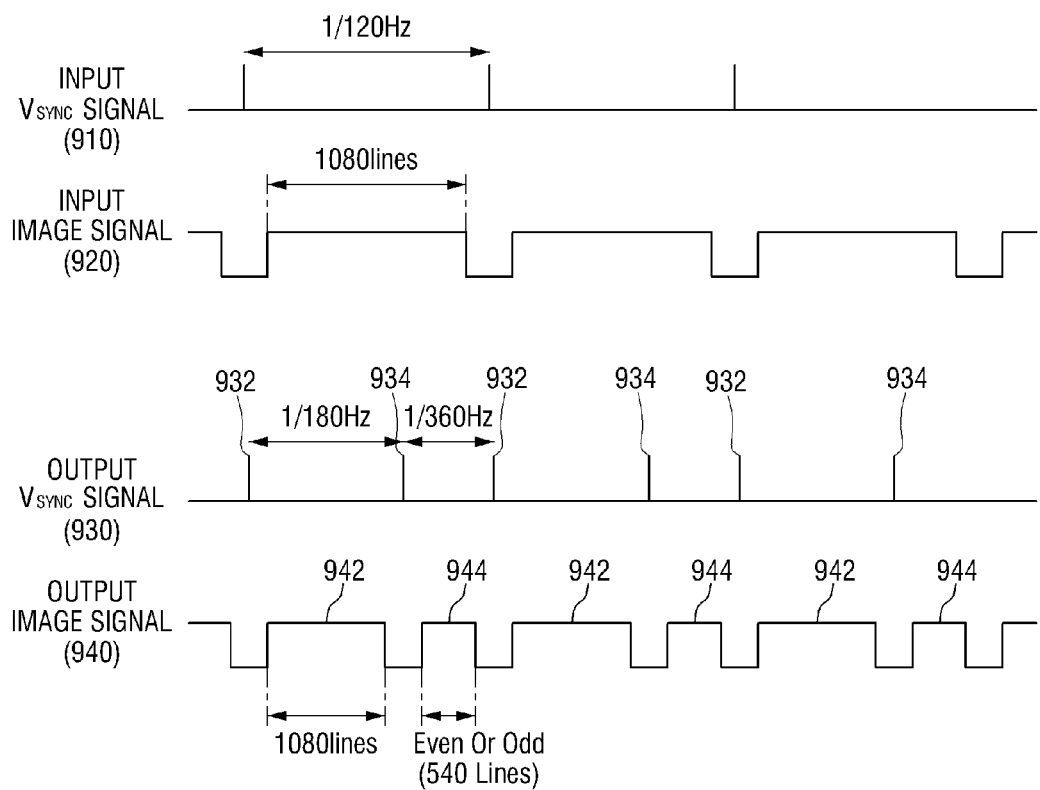
FIG. 9 is a view to explain a method of outputting a vertical sync signal and an image signal using an input vertical sync signal and an input image signal in an image processing apparatus according to an exemplary embodiment.

FIG. 9 is a view to explain a method of outputting a vertical sync signal and an image signal using an input vertical sync signal and an input image signal in an image processing apparatus according to an exemplary embodiment.

As illustrated in FIG. 9, an input unit of the image processing apparatus, according to an exemplary embodiment, may receive a Vsync signal 910 and an image signal 920. In the present exemplary embodiment, it can be seen that the frequency of the input Vsync signal 910 is 120 Hz, the frequency of the input image signal 920 is 120 Hz, and the number of horizontal lines is 1080. In addition, a Vsync signal generating unit of the image processing apparatus generates an output Vsync signal 930, and the output Vsync signal 930 may be specifically divided into a first output Vsync signal 932 and a second output Vsync signal 934. In addition, it can be seen that the period between a second output Vsync signal 934 and a first output Vsync signal 932 is $1/180$ Hz, and the period between the second output Vsync signal 934 and the first output Vsync signal 932 is $1/360$ Hz. In addition, a scanning signal generating unit of the image processing apparatus, according to an exemplary embodiment, generates a scanning signal 940 for scanning part of an image signal in a scanning section which is divided according to the output Vsync signal 930. Specifically, a scanning signal 940 may be divided into a first scanning signal 942 for scanning a left eye image signal or a right eye image single of an image signal according to the first output Vsync signal 932 and a second scanning signal 944 for scanning part of the left eye image signal or part of the right eye image single of the image signal according to the second output Vsync signal 934. In addition, it can be seen that the number of horizontal lines of the first scanning signal 942 is 1080 and the number of horizontal lines of the second scanning signal 944 is 540, corresponding to even number lines or odd number lines of the left eye image signal or the right eye image signal in the present exemplary case.

Figure 10:
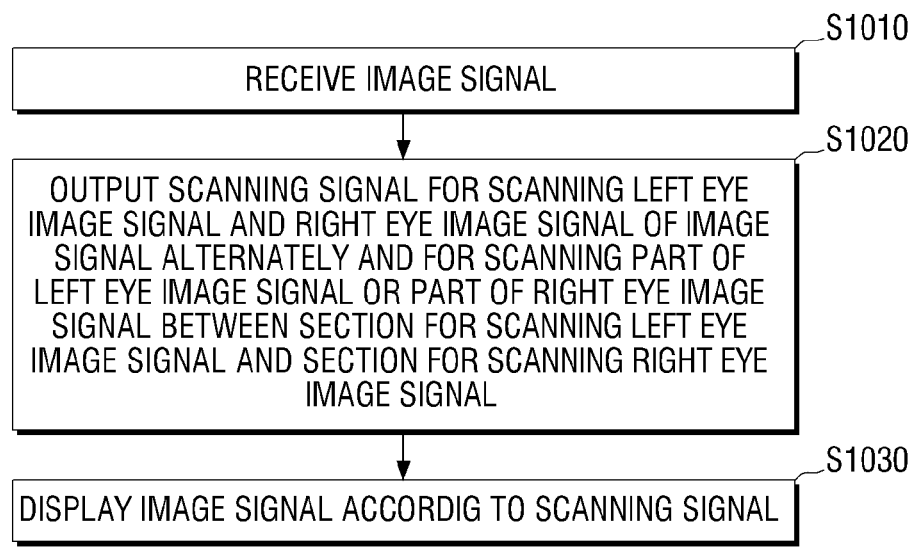
FIG. 10 is a flowchart illustrating a display method according to an exemplary embodiment.

FIG. 10 is a flowchart illustrating a display method according to an exemplary embodiment. The display method according to the present exemplary embodiment may be applied to the display apparatuses 200 and 300 illustrated in FIGS. 2 and 3. Therefore, for convenience of description, overlapping descriptions will not be provided herein.

Referring to FIG. 10, an image signal receiving unit of a display apparatus according to an exemplary embodiment receives a 2D image signal or a 3D image signal (operation S1010).

Subsequently, a left eye image signal and a right eye image signal of an image signal are scanned alternately, and a scanning signal for scanning part of the left eye image signal or part of the right eye image signal is output between a section for scanning the left eye image signal and a section for scanning the right eye image signal (operation S1020).

In an exemplary embodiment, the operation of outputting a scanning signal (operation S1020) may include determining whether a received image signal is a 2D image signal or a 3D image signal, if it is determined the received image signal is a 3D image signal, determining whether the 3D image signal is a left eye image signal or a right eye image signal, and outputting a scanning signal for scanning part of horizontal lines of the left eye image signal or part of horizontal lines of the right eye image signal between a section for scanning the right eye image signal and a section for scanning the right eye image signal.

In this case, the scanning signal may be a scanning signal for scanning part of the left eye image signal or part of the right eye image signal between a pair of vertical blanking sections.

According to an exemplary embodiment, the part of the left eye image signal or the part of the right eye image signal may be an image signal corresponding to a scope allowed by the bandwidth of the display apparatus.

In other words, the part of the left eye image signal or the part of the right eye image signal may be an image signal corresponding to horizontal lines from a first horizontal line of the image signal sequentially to a horizontal line in a scope which is allowed by the bandwidth of the display apparatus.

According to another exemplary embodiment, the part of the left eye image signal or the part of the right eye image signal may be an image signal corresponding to horizontal lines from a next horizontal line of the image signal in the previously described exemplary embodiment and onwards, and corresponding to a scope allowed by the bandwidth of the display apparatus.

According to yet another exemplary embodiment, at least one of the part of the left eye image signal and the part of the right eye image signal may be an even number line signal or an odd number line signal of the corresponding image signal.

In other words, the part of the left eye image signal or the part of the right eye image signal may be a signal corresponding to the even number lines or the odd number lines of the corresponding image signal.

Meanwhile, in the present exemplary embodiment, if the part of the left eye image signal or the part of the right eye image signal, specifically in one of consecutive frames, is a signal corresponding only to an odd number line, the part of the left eye image signal or the part of the right eye image signal in the next frame may be a signal corresponding to even number lines. In addition, from the next frame, the part of the left eye image signal or the part of the right eye image signal may be a signal corresponding only to odd number lines or even number lines alternately.

According to another exemplary embodiment, the part of the left eye image signal or the part of the right eye image signal may be a line signal which is selected randomly from among horizontal scanning lines of a corresponding image signal.

In other words, the part of the left eye image signal or the part of the right eye image signal may be part of a line signal which is selected randomly from among the horizontal scanning lines of an image signal corresponding to the left eye image signal or the right eye image signal.

According to still another exemplary embodiment, the part of the left eye image signal or the part of the right eye image signal may be a signal where change in a screen is greater than a predetermined reference value in a corresponding image signal. In other words, only the image signal corresponding to the lines with significant change in the screen is scanned.

According to another exemplary embodiment, the part of the left eye image signal or the part of the right eye image signal may be a signal where change in the screen is less than a predetermined reference value in a corresponding image signal. In other words, only the image signal corresponding to the lines with little change in the screen is scanned.

According to yet another exemplary embodiment, the part of the left eye image signal or the part of the right eye image signal may be a signal corresponding to a central area that a user focuses on the screen. In other words, only the image signal corresponding to the lines that the user watches most frequently is scanned.

Meanwhile, the part of the left eye image signal or the part of the right eye image signal may downscale at least one of the left image signal and the right eye image signal to an even number line signal or an odd number line signal of the corresponding image signal, or may include correction image information for correcting a charge rate of a liquid crystal by filtering the left eye image signal or the right eye image signal.

In this exemplary case, the correction image information is included because, if an LCD applies a scanning signal of an image signal to a panel unit, the gate driver of the panel unit drives a horizontal line of the liquid crystal for every frame and a source driver applies a grayscale value of a corresponding pixel to a vertical line to be displayed from among the horizontal lines being driven. In this case, the source driver may reset the applied grayscale value of the corresponding pixel for each frame and apply a new grayscale value.

However, as the charge rate of the liquid crystal may not be perfect, there could be a difference between the grayscale value which is actually displayed by the panel unit and the grayscale value which is applied to the panel unit. According to an exemplary embodiment, however, when the grayscale value of a corresponding pixel to be displayed for each frame is applied, the grayscale value of a charged liquid crystal in the previous frame is not reset. Rather, correction image information for correcting a displayed grayscale value of the corresponding pixel in the previous frame may be included in part of a left eye image signal or part of a right eye image signal.

In an exemplary embodiment, the operation of outputting a scanning signal (operation S1020) may include generating an output Vsync signal corresponding to an image signal and outputting a scanning signal which is divided into a section for scanning a left eye image signal, a section for scanning part of the left eye image signal, a section for scanning a right eye image signal, and a section for scanning part of the right eye image signal according to the generated output Vsync signal.

Furthermore, an image signal is displayed according to the scanning signal (operation S1030). For example, the operation of displaying the image signal (operation S1030) may include, if a received image signal is a 2D image signal, displaying the 2D image on an LCD panel according to a general 2D image signal, and if the received image signal is a 3D image signal, processing the 3D image signal as described above and displaying the 3D image on the LCD panel.

Meanwhile, the display method according to the present exemplary embodiment may further include generating a shutter glasses sync signal for turning on the left shutter of shutter glasses when a section for scanning part of a left eye image signal starts, turning off the left shutter of shutter glasses when a section for scanning part of the left eye image signal ends, turning on the right shutter of shutter glasses when a section for scanning part of a right eye image signal starts, and turning off the right shutter of shutter glasses when a section for scanning part of the right eye image signal ends, and modulating the generated shutter glasses sync signal to an IR signal or an RF signal and outputting the IR signal or the RF signal.

Accordingly, the display method according to an exemplary embodiment may allow the left eye image signal and the right eye image signal to be recognized exactly by the left eye and the right eye, respectively, by turning on and off the left shutter of the shutter glasses in a section for scanning part of the left eye image signal and turning on and off the right shutter of the shutter glasses in a section for scanning part of the right eye image signal.

Meanwhile, in another exemplary embodiment, the display method may not turn on the left shutter or the right shutter of the shutter glasses only in a section for scanning part of the left eye image signal or part of the right eye image. Instead, the display method according to another exemplary embodiment may generate a shutter glasses sync signal for turning on the shutter of a corresponding image signal at a point of time when a first VBI section starts in a pair of VBI sections located in each side of a scanning signal for scanning part of the left eye image signal or part of the right eye image signal, and turning off the shutter of a corresponding image signal at a point of time when the next VBI section ends.

Figure 11:
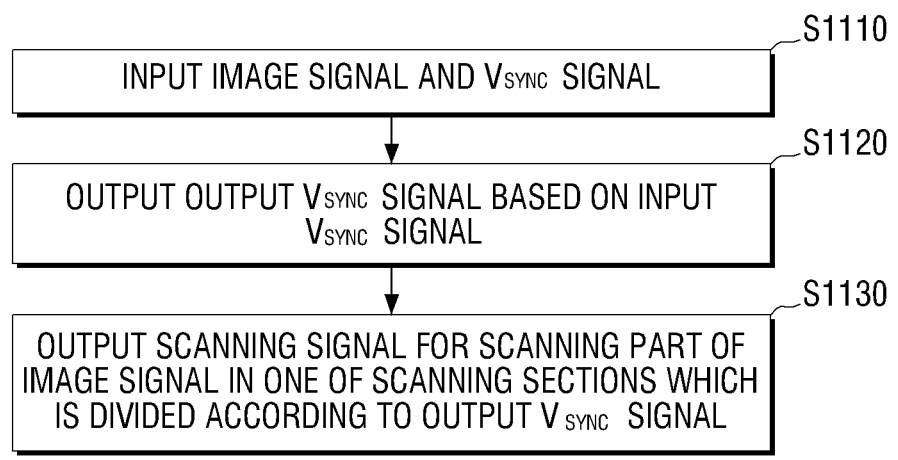
FIG. 11 is a flowchart illustrating a display method according to another exemplary embodiment.

FIG. 11 is a flowchart illustrating a display method according to another exemplary embodiment. The display method according to the present exemplary embodiment may be applied to the image processing apparatuses 700 and 800 illustrated in FIGS. 7 and 8. Therefore, for convenience of description, overlapping descriptions will not be provided herein.

Referring to FIG. 11, an input unit of an image processing apparatus according to an exemplary embodiment receives an image signal and a Vsync signal (operation S1110).

Subsequently, an output Vsync signal is output based on the input Vsync signal (operation S1120).

In an exemplary embodiment, the operation of outputting the output Vsync signal (operation S1120) may output a first output Vsync signal and a second Vsync signal based on the input Vsync signal.

Furthermore, a scanning signal for scanning part of an image signal in one of sections which is divided according to an output Vsync signal is output (operation S1130).

Meanwhile, in the operation of outputting the output Vsync signal (operation S1120), if the first output Vsync signal and the second output Vsync signal are generated, the operation of outputting the scanning signal (operation S1130) may include outputting a first scanning signal for scanning a left eye image signal or a right eye image signal of an image signal according to the first output Vsync signal, and a second scanning signal for scanning part of the corresponding image signal according to the second output Vsync signal.

In this exemplary case, frame rates of the first scanning signal and the second scanning signal may be greater than a frame rate of an input image signal.

In an exemplary embodiment, the operation of outputting the scanning signal (operation S1130) may include downscaling at least one of part of the left eye image signal and part of the right eye image signal of an image signal to an even number line signal or an odd number line signal of the corresponding image signal, and may include correction image information for correcting the charge rate of a liquid crystal by filtering the left eye image signal or the right eye image signal.

In this case, the correction image information may be included because, if an LCD applies a scanning signal of an image signal to a panel unit, the gate driver of the panel unit drives a horizontal line of the liquid crystal for every frame and a source driver applies a grayscale value of a corresponding pixel to a vertical line to be displayed from among the horizontal lines being driven. In this case, the source driver may reset the applied grayscale value of the corresponding pixel for each frame and apply a new grayscale value.

However, as the charge rate of the liquid crystal may not be perfect, there could be a difference between the grayscale value which is actually displayed by the panel unit and the grayscale value which is applied to the panel unit. According to an exemplary embodiment, however, when the grayscale value of a corresponding pixel to be displayed for each frame is applied, the grayscale value of a charged liquid crystal in the previous frame is not reset. Rather, correction image information for correcting a displayed grayscale value of the corresponding pixel in the previous frame may be included in part of a left eye image signal or part of a right eye image signal.

According to an exemplary embodiment, the part of the left eye image signal or the part of the right eye image signal may be an image signal corresponding to a scope allowed by the bandwidth of the image processing apparatus.

According to another exemplary embodiment, the part of the left eye image signal or the part of the right eye image signal may be an image signal corresponding to horizontal lines from a next horizontal line of the image signal in the previously described exemplary embodiment and onwards, and corresponding to a scope allowed by the bandwidth of the display apparatus.

According to yet another exemplary embodiment, at least one of the part of the left eye image signal and the part of the right eye image signal may be an even number line signal or an odd number line signal of the corresponding image signal.

Meanwhile, in the present exemplary embodiment, if the part of the left eye image signal or the part of the right eye image signal, specifically in one of consecutive frames, is a signal corresponding only to an odd number line, the part of the left eye image signal or the part of the right eye image signal in the next frame may be a signal corresponding to even number lines. In addition, from the next frame, the part of the left eye image signal or the part of the right eye image signal may be a signal corresponding only to odd number lines or even number lines alternately.

According to another exemplary embodiment, the part of the left eye image signal or the part of the right eye image signal may be a line signal which is selected randomly from among horizontal scanning lines of a corresponding image signal.

According to still another exemplary embodiment, the part of the left eye image signal or the part of the right eye image signal may be a signal where change in a screen is greater than a predetermined reference value in a corresponding image signal.

According to another exemplary embodiment, the part of the left eye image signal or the part of the right eye image signal may be a signal where change in the screen is less than a predetermined reference value in a corresponding image signal.

According to yet another exemplary embodiment, the part of the left eye image signal or the part of the right eye image signal may be a signal corresponding to a central area that a user focuses on the screen.

Meanwhile, the image processing method according to an exemplary embodiment may further include generating a shutter glasses sync signal for turning on the left shutter of shutter glasses when a section for scanning part of a left eye image signal starts, turning off the left shutter of shutter glasses when a section for scanning part of the left eye image signal ends, turning on the right shutter of shutter glasses when a section for scanning part of a right eye image signal starts, and turning off the right shutter of shutter glasses when a section for scanning part of the right eye image signal ends, and modulating the generated shutter glasses sync signal to an IR signal or an RF signal and outputting the IR signal or the RF signal.

Accordingly, the image processing method according to an exemplary embodiment may allow the left eye image signal and the right eye image signal to be recognized exactly by the left eye and the right eye, respectively, by turning on and off the left shutter of the shutter glasses in a section for scanning part of the left eye image signal and turning on and off the right shutter of the shutter glasses in a section for scanning part of the right eye image signal.

Meanwhile, in another exemplary embodiment, the image processing method may not turn on the left shutter or the right shutter of the shutter glasses only in a section for scanning part of the left eye image signal or part of the right eye image. Instead, the display method according to another exemplary embodiment may generate a shutter glasses sync signal for turning on the shutter of a corresponding image signal at a point of time when a first VBI section starts in a pair of VBI sections located in each side of a scanning signal for scanning part of the left eye image signal or part of the right eye image signal, and turning off the shutter of a corresponding image signal at a point of time when the next VBI section ends.

While not restricted thereto, it is understood that an exemplary embodiment may be embodied as a program command executable through various computer devices and recorded in a recording medium readable by a computer. In this case, the recording medium readable by a computer may include a program command, a data file, and data configuration, alone or in combination. Meanwhile, the program command recorded in a recording medium may be specially designed and configured for the present invention or may be known to and commonly used by those skilled in the field of computer software industry.

The recording medium readable by a computer includes magnetic media such as a hard disk, a floppy disk, and a magnetic tape, optical media such as a CD-ROM and a DVD, magneto-optical media such as an optical disk, and a hardware apparatus specially designed to store and perform a program command such as ROM, RAM, and a flash memory. Furthermore, an exemplary embodiment may be embodied as a program command executable through various computer devices and a transmission medium such as an optical or metal strip and waveguide including a carrier wave which transmits a signal designating a program command, data configuration, and so forth.

Furthermore, the program command may include a machine code composed by a compiler and a high-level language code executable by a computer using an interpreter. The above-described hardware apparatuses may be configured to operate as more than one software module to perform operations of the present invention and vice versa.

Although a few exemplary embodiments have been shown and described, it would be appreciated by those skilled in the art that changes may be made in the exemplary embodiments without departing from the principles and spirit of the inventive concept, the scope of which is defined in the claims and their equivalents.

What is claimed is:

1. A display apparatus, comprising:
an image signal receiving unit which receives an image signal;
an image signal processing unit which generates a first scanning signal for alternately scanning a left eye image signal during a section for scanning the left eye image signal and a right eye image signal during a section for scanning the left eye image signal corresponding to the received image signal and generates a second scanning signal for scanning one of a part of the left eye image signal and a part of the right eye image signal between the section for scanning the left eye image signal and the section for scanning the right eye image signal; and
an image output unit which displays the received image signal according to the scanning signal,
wherein the second scanning signal is a scanning signal for scanning the part of the left eye image signal or the part of the right eye image signal between a pair of vertical blanking sections.

2. The display apparatus as claimed in claim 1, further comprising:
a sync signal generating unit which generates a shutter glasses sync signal for turning on a left shutter of shutter glasses for viewing the received image signal when a section for scanning the part of the left eye image signal starts, turning off the left shutter when the section for scanning the part of the left eye image signal ends, turning on a right shutter of the shutter glasses when a section for scanning the part of the right eye image signal starts, and turning off the right shutter when the section for scanning the part of the right eye image signal ends.

3. The display apparatus as claimed in claim 2, further comprising:

a shutter glasses sync signal output unit which outputs the generated shutter glasses sync signal as an infrared (IR) signal or a radio frequency (RF) signal.

4. The display apparatus as claimed in claim 1, wherein the image signal processing unit comprises:
- a three-dimensional (3D) image signal determining unit which determines whether the received image signal is a two-dimensional (2D) image signal or a 3D image signal;
- an eye image signal determining unit which, if the received image signal is the 3D image signal, determines whether the 3D image signal is the left eye image signal or the right eye image signal; and
- a scanning signal generating unit which generates the second scanning signal for scanning a part of horizontal lines of the left eye image signal or a part of horizontal lines of the right eye image signal between the section for scanning the left eye image signal and the section for scanning the right eye image signal.

5. The display apparatus as claimed in claim 1, wherein the one of the part of the left eye image signal and the part of the right eye image signal is an image signal corresponding to a scope allowed by a bandwidth of the display apparatus.

6. The display apparatus as claimed in claim 1, wherein the one of the part of the left eye image signal and the part of the right eye image signal is an even number line signal or an odd number line signal.

7. The display apparatus as claimed in claim 1, wherein the one of the part of the left eye image signal and the part of the right eye image signal is a line signal which is selected randomly from among horizontal scanning lines of a corresponding one of the left eye image signal and the right eye image signal.

8. The display apparatus as claimed in claim 1, wherein the one of the part of the left eye image signal and the part of the right eye image signal is a portion of a corresponding one of the left eye image signal and the right eye image signal where change in a screen is greater than a predetermined reference value.

9. The display apparatus as claimed in claim 1, wherein the one of the part of the left eye image signal and the part of the right eye image signal is a portion of a corresponding one of the left eye image signal and the right eye image signal where change in a screen is less than a predetermined reference value.

10. The display apparatus as claimed in claim 1, wherein the one of the part of the left eye image signal and the part of the right eye image signal is a portion of a downscaled corresponding one of the left eye image signal and the right eye image signal, the downscaled corresponding one of the left eye image signal and the right eye image signal being an even number line signal or an odd number line signal, or the one of the part of the left eye image signal and the part of the right eye image signal comprises correction image information for correcting a charge rate of a liquid crystal by filtering the corresponding one of the left eye image signal and the right eye image signal.

11. The display apparatus as claimed in claim 1, wherein the image signal processing unit generates an output vertical sync (Vsync) signal corresponding to the received image signal and generates the first scanning signal which is divided into the section for scanning the left eye image signal and the section for scanning the right eye image signal, and generates the second scanning signal which is divided into a section for scanning the part of the left eye image signal and a section for scanning the part of the right eye image signal according to the generated output Vsync signal.

12. A display method of a display apparatus, the display method comprising:
- receiving an image signal;
- outputting a first scanning signal for alternately scanning a left eye image signal during a section for scanning the left eye image signal and a right eye image signal during a section for scanning the left eye image signal corresponding to the received image signal and generates a second scanning signal for scanning one of a part of the left eye image signal and a part of the right eye image signal between the section for scanning the left eye image signal and the section for scanning the right eye image signal; and
- displaying the received image signal according to the scanning signal
- wherein the second scanning signal is a scanning signal for scanning the part of the left eye image signal or the part of the right eye image signal between a pair of vertical blanking sections.

13. The display method as claimed in claim 12, further comprising:
- generating a shutter glasses sync signal for turning on a left shutter of shutter glasses for viewing the received image signal when a section for scanning the part of the left eye image signal starts, turning off the left shutter when the section for scanning the part of the left eye image signal ends, turning on a right shutter of the shutter glasses when a section for scanning the part of the right eye image signal starts, and turning off the right shutter when the section for scanning the part of the right eye image signal ends.

14. The display method as claimed in claim 13, further comprising:
- outputting the generated shutter glasses sync signal as an infrared (IR) signal or a radio frequency (RF) signal.

15. The display method as claimed in claim 12, wherein the outputting the scanning signal comprises:
- determining whether the received image signal is a two-dimensional (2D) image signal or a three-dimensional (3D) image signal;
- if the received image signal is the 3D image signal, determining whether the 3D image signal is the left eye image signal or the right eye image signal; and
- outputting the second scanning signal for scanning a part of horizontal lines of the left eye image signal or a part of horizontal lines of the right eye image signal between the section for scanning the left eye image signal and the section for scanning the right eye image signal.

16. The display method as claimed in claim 12, wherein the one of the part of the left eye image signal and the part of the right eye image signal is an image signal corresponding to a scope allowed by a bandwidth of the display apparatus.

17. The display method as claimed in claim 12, wherein the one of the part of the left eye image signal and the part of the right eye image signal is an even number line signal or an odd number line signal.

18. The display method as claimed in claim 12, wherein the one of the part of the left eye image signal and the part of the right eye image signal is a line signal which is selected randomly from among horizontal scanning lines of a corresponding one of the left eye image signal and the right eye image signal.

19. The display method as claimed in claim 12, wherein the one of the part of the left eye image signal and the part of the right eye image signal is a portion of a downscaled corresponding one of the left eye image signal and the right eye image signal, the downscaled corresponding one of the left eye image signal and the right eye image signal being an even number line signal or an odd number line signal, or the one of the part of the left eye image signal and the part of the right eye image signal comprises correction image information for correcting a charge rate of a liquid crystal by filtering the corresponding one of the left eye image signal and the right eye image signal.

20. The display method as claimed in claim 12, wherein the outputting the scanning signal comprises:
- generating an output vertical sync (Vsync) signal corresponding to the received image signal; and
- outputting the first scanning signal which is divided into the section for scanning the left eye image signal and the section for scanning the right eye image signal, and the second scanning signal which is divided into a section for scanning the part of the left eye image signal and a section for scanning the part of the right eye image signal according to the generated output Vsync signal.

21. A computer readable recording medium having recorded thereon a program executable by a computer for performing the method of claim 12.

\* \* \* \* \*